US008619933B2

(12) United States Patent
Aoyagi

(10) Patent No.: US 8,619,933 B2
(45) Date of Patent: Dec. 31, 2013

(54) RECEIVER APPARATUS FOR ABSORBING CLOCK DIFFERENCE BETWEEN TRANSMITTING AND RECEIVING SIDES AND A METHOD THEREFOR

(75) Inventor: Hiromi Aoyagi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 731 days.

(21) Appl. No.: 12/656,766

(22) Filed: Feb. 16, 2010

(65) Prior Publication Data

US 2010/0239054 A1 Sep. 23, 2010

(30) Foreign Application Priority Data

Mar. 23, 2009 (JP) ................................ 2009-070831

(51) Int. Cl.
*H04L 7/00* (2006.01)

(52) U.S. Cl.
USPC .......................................................... 375/371

(58) Field of Classification Search
USPC .......................................... 375/355, 371, 375
See application file for complete search history.

(56) References Cited

U.S. PATENT DOCUMENTS

| | | | | |
|---|---|---|---|---|
| 2006/0247810 | A1 * | 11/2006 | Risbo et al. | 700/94 |
| 2008/0183755 | A1 * | 7/2008 | Zak | 707/104.1 |
| 2009/0171666 | A1 * | 7/2009 | Ohtsu | 704/265 |

FOREIGN PATENT DOCUMENTS

| | | | |
|---|---|---|---|
| JP | 11272295 | A | 10/1999 |
| JP | 2003046490 | A | 2/2003 |

* cited by examiner

*Primary Examiner* — Kevin Kim
(74) *Attorney, Agent, or Firm* — Rabin & Berdo, P.C.

(57) ABSTRACT

Data received by a receiver is processed at a sampling rate indicated manually or automatically in the receiver. The sampling rate of the received data is controlled in accordance with the processing rate. The sampling rate controlled data is then processed so as to convert its frequency distribution to that the received data originally had.

6 Claims, 3 Drawing Sheets

RECEIVER APPARATUS FOR ABSORBING CLOCK DIFFERENCE BETWEEN TRANSMITTING AND RECEIVING SIDES AND A METHOD THEREFOR

BACKGROUND OF THE INVENTION

1. Field of the Invention

The present invention relates to a receiver and a method therefor, and more particularly a receiver applicable, for example, to a terminal device for transmitting and receiving signal such as voice signal over a telecommunications network such as an IP (Internet protocol) network.

2. Description of the Background Art

In recent years, voice communication over an IP network, i.e. Voice over Internet Protocol (VoIP) network, has become widespread. In a VoIP network, each terminal device has its own operational clock system specifically provided thereto. Even though they are intended to have the same clock frequency, it would vanishingly be improbable that they coincide with each other, due to the operational clocks working specifically to the respective terminal devices. For this reason, there occurs difference in working speed, even a minute difference in operational clock frequency, between the terminal devices, which brings about excess or deficiency in received data in their receiver buffers when processing the received data.

In view of solving the problems described above, in Japanese patent laid-open publication No. 2003-46490 to Fushimi, et al., there is proposed a method for correcting excess or deficiency in the received data, i.e. a method for covering a difference in operational clock frequency, by adjusting a silent section of the received data in the buffer so as to delete a part of, or insert unvoiced data into, the silent section.

Further, in Japanese patent laid-open publication No. 272295/1999 to Sasaki, there is a proposed method for correcting excess or deficiency in received data, i.e. covering a difference in operational clock frequency, by controlling the receiver buffer in terms of a count of samples of the received data per predetermined length of time, i.e. sampling rate.

However, the method disclosed in Fushimi, et al., involves problems of degradation in sound quality, such as telephone speech quality, caused by erroneous decision on a voiced/unvoiced section or by fluctuation in the ratio of the length of voiced section to the length of unvoiced section.

Further, a method disclosed in Sasaki involves a problem of change in frequency components of received signals due to control over the sampling rate. For example, in the case that a voice signal is received from a speaker, change in the frequency components causes change in the sound quality, which might reproduce a different voice from the original voice of that speaker. Moreover, in the case that a sound signal other than voice signal is received, change in the frequency components causes change in the frequency that the sound originally has. The above-described problems are extremely significant.

SUMMARY OF THE INVENTION

It is an object of the invention is to provide a receiver and a method therefor, which can absorb a difference in operational clock frequency between the receiver and a transmitter which sends voice/sound signals to the receiver, while controlling degradation and change in sound quality.

In accordance with the invention, a receiver apparatus for receiving an encoded signal including a voice signal or sound signal which is to be processed in the receiver comprises a decoder for decoding the encoded signal incoming to the receiver to thereby produce a decoded signal, a sample rate converter for controlling a count of samples of the received signal per unit of time, according to sampling rate controlling information given externally, and a frequency distribution converter for converting frequency distribution of the signal obtained from the sample rate converter, according to frequency distribution converting information given externally.

In accordance with the invention, a receiving method for processing an encoded signal incoming to a receiver and including a voice signal or sound signal comprises the steps of decoding the encoded signal incoming to the receiver to thereby produce a decoded signal, controlling a count of samples of the received signal per unit of time, according to sampling rate controlling information given externally, and converting frequency distribution of the signal obtained by the step of controlling, according to frequency distribution converting information given externally.

Further in accordance with the invention, a processing program for processing an encoded signal incoming to a receiver and including a voice signal or sound signal which is to be processed in the receiver controls the computer, when installed in and executed on the computer, to function as the receiver by executing the steps of decoding the encoded signal incoming to the receiver, controlling a count of samples of the received signal per unit of time, according to sampling rate controlling information given externally, and converting frequency distribution of the signal obtained by the step of controlling, according to frequency distribution converting information given externally.

In accordance with the invention, a receiver, a method and a computer program therefor will be provided which can absorb a difference in clock frequency between the receiver and a transmitter which sends voice/sound data to the receiver, while degradation and change in sound quality are controlled.

In the context, the term "sound signal" or "sound data" may more broadly be comprehended so as to cover the possibility of including audible sound other than voice.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

In the following, a preferred embodiment of a receiver in accordance with the invention will be described in detail with reference to the accompanying drawings Referring initially to FIG. 1, there is shown an embodiment of a receiver 100 in accordance with the present invention. In this embodiment, the receiver 100 may be used in a terminal unit such as a phone terminal and a soft-phone for dealing with voice signals.

The receiver 100 of the illustrative embodiment is connected to a telecommunications network, such as an IP (Internet Protocol) network, not shown, to receive voice signals transmitted from a transmitter over the network. The receiver 100 is arranged to absorb a difference in clock frequency between the transmitter and the receiver by controlling signal a count of samples of received voice signals per unit period of time, hereinafter also referred to as "sample count", as well as to prevent change in sound quality when the voice sample count fluctuates.

Figure 1:
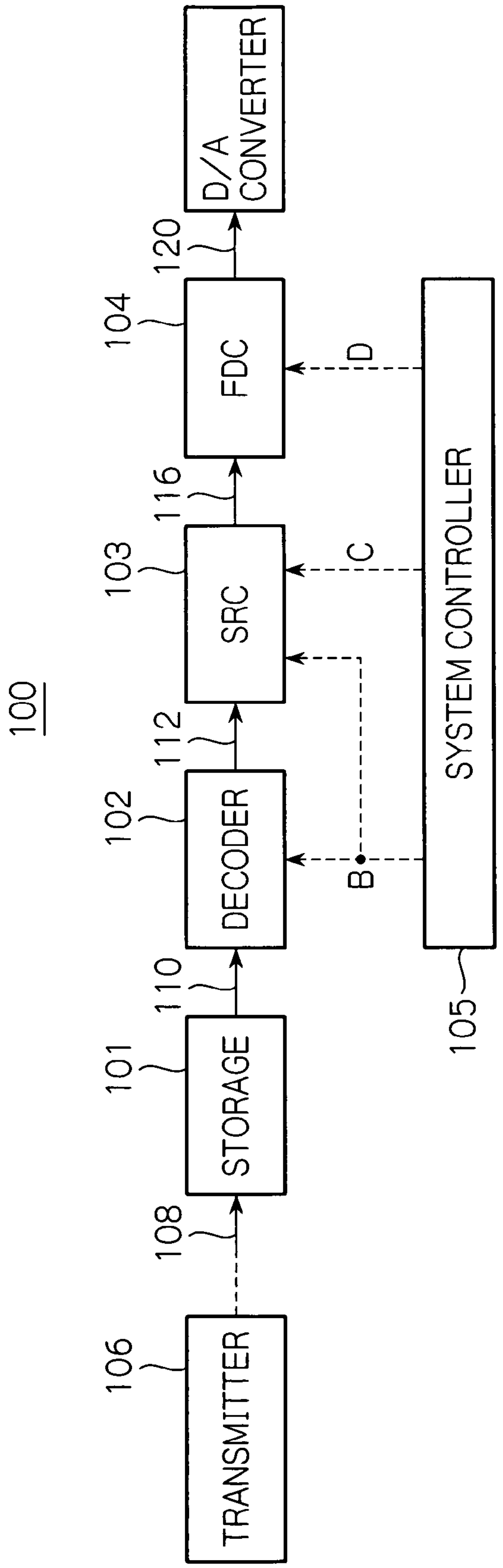
FIG. 1 is a schematic block diagram showing a specific configuration of an illustrative embodiment of a receiver in accordance with the present invention.

FIG. 1 schematically shows in a block diagram the structure of the main part of the receiver 100. The receiver 100 may be equipped in a soft-phone and implemented by a processor system including a CPU (Central Processor Unit) and program sequences installed in and executed by the processor system, where the functional phase of the receiver can be presented in the form of block diagram. It is to be noted that such a depiction and a description do not restrict the receiver 100 to an implementation only in the form of hardware but at least a part or the entirety of the receiver 100 may be implemented by software. That may also be the case with an alternative embodiment which will be described below. In this connection, the word "circuit" may be understood not only as hardware, such as an electronics circuit, but also as a function that may be implemented by software installed and executed on a processor system.

In FIG. 1, the receiver 100 of the embodiment comprises a voice data receiving storage 101 functioning as a receiver buffer, a decoder 102, a sample rate converter (SRC) 103, a frequency distribution converter (FDC) 104 and a system controller 105, which are interconnected as illustrated. The receiver 100 is adapted for receiving, when involved in a communication connection established to a transmitter 100, encoded voice data 108 transmitted from the transmitter 106 over the IP network in the form of packets, for example. The received packets may be disassembled and encoded voice data 108 may be taken out of the packets in the receiver 100. Alternatively, encoded voice data may be transmitted in a serial form, for example.

The storage 101 is adapted for buffering the encoded voice data 108 received by the receiver 100 and supplying the data 108 to the decoder 102 on a connection 110. Signals are designated with reference numerals of connections on which they are conveyed.

The decoder 102 is adapted to be responsive to, or synchronous with, a startup signal B supplied from the controller 105 to decode a unit of encoded data 110. In the instant embodiment, which is applied to, for example, ITU-T (International Telecommunication Union Telecommunication Standardization Sector) Recommendation G. 729 to compress the encoded data 108 from the transmitter 106, such a unit of data corresponds to a temporal section of 10 ms. The decoder 102 supplies the decoded data 112 to the sample rate converter 103.

The sample rate converter (SRC) 103 is adapted to be responsive also to, or synchronous with, the startup signal B provided from the controller 105 to control the sampling rate of the decoded data 108 according to a conversion coefficient C also provided from the controller 105 simultaneously with the signal B to produce output data 116 at the sampling rate thus converted.

In this specific embodiment, where original voice signals are sampled at a sampling frequency of 8 kHz to thereby form the encoded data 108, for example, which are in turn transmitted from the transmitter 106 and each unit of encoded data corresponds to a period of 10 ms as stated above, the sample rate converter 103 constantly receives 80 samples of voice data per unit.

Now, when the conversion coefficient supplied to the sample rate converter 103 is 1.0, the sample rate converter 103 outputs 80 samples from every unit of inputted samples 112. However, when the conversion coefficient C is 0.9, then the sample rate converter 103 takes 72 samples from every unit of input data 112, i.e. every 80 input samples, as output data 116. When the conversion coefficient C is 1.1, then the sample rate converter 103 takes 88 samples from every unit of input data 112.

Looking at only the counts of samples input to or output from the sample rate converter 103 as one unit, they are different from each other, and thus the conversion corresponds to the conversion of the sampling rate. Specifically, when the conversion coefficient C is equal to 0.9, conversion of the rate is executed from 8 kHz to 7.2 kHz. When the conversion coefficient C is 1.1, conversion of the rate is executed from 8 kHz to 8.8 kHz.

The sample rate converter 103 in the embodiment keeps the output rate of the output data 116 at a certain rate, e.g. 80 samples per 10 ms, by changing the time interval for inputting to the sample rate converter 103 each unit of data 112, i.e. by changing the input rate of 80 samples.

Specifically, the startup signal B is issued from the controller 105, as will be described later on, at the timing associated with the conversion coefficient C, the decoder 102 is responsive to the startup signal B to supply one unit of data 112, namely, the decoder 102 outputs the unit of data 112 at the timing corresponding to the coefficient C. For example, when the conversion coefficient C is 1.0, 0.9 and 1.1, the decoder 102 startups itself and supplies the decoded data 112 to the sample rate converter 103 every 10 ms, 9 ms and 11 ms, respectively, whereby the converter 103 keeps its output rate substantially constant.

The output data 116 developed from the sample rate converter 103, namely, after processed by the converter 103, are different in frequency distribution from the input data 112 entered into the sample rate converter 103. The output data 116 are input to the frequency distribution converter 104.

The frequency distribution converter 104 is adapted to be in response to a frequency conversion signal D provided from the controller 105 to correct the frequency distribution of the output data 116 delivered from the sample rate converter 103 to output the resultant data 120. To the frequency distribution converter 104, the mechanism of varying the sound pitch and sound quality utilized in, e.g. a karaoke console, is applicable.

Figure 2:
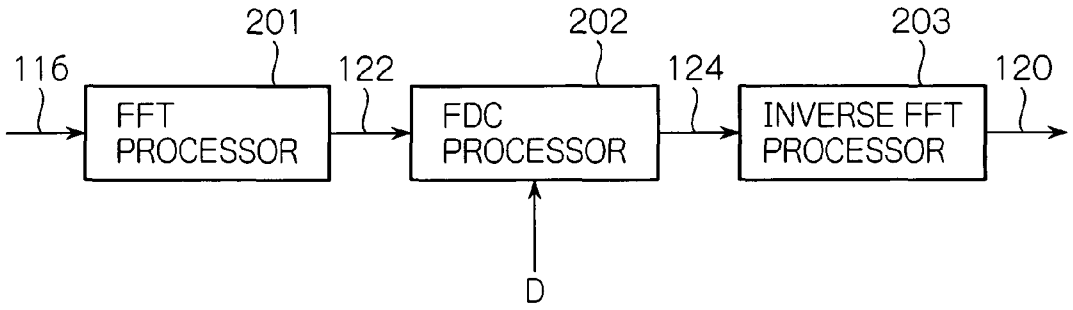
FIG. 2 is a schematic block diagram showing a specific detailed configuration of a frequency distribution converter shown in FIG. 1.

FIG. 2 schematically shows in a block diagram an example of the internal arrangement of the frequency distribution converter 104. As shown in the figure, the frequency distribution converter 104 comprises a Fast Fourier transform (FFT) processor 201, a frequency distribution converting (FDC) processor 202 and a inverse FFT processor 203, which are interconnected as illustrated.

The FFT processor 201 is adapted for subjecting the output data 116 from the sample rate converter 103 to an FFT process.

The frequency distribution converting processor 202 is adapted for converting the frequency distribution of the FFT processed data 122 in response to the frequency conversion signal D provided from the controller 105.

The inverse FFT processor 203 is adapted for subjecting to a inverse FFT process the frequency converted data 124 delivered from the frequency distribution converting processor 202.

Figure 3:
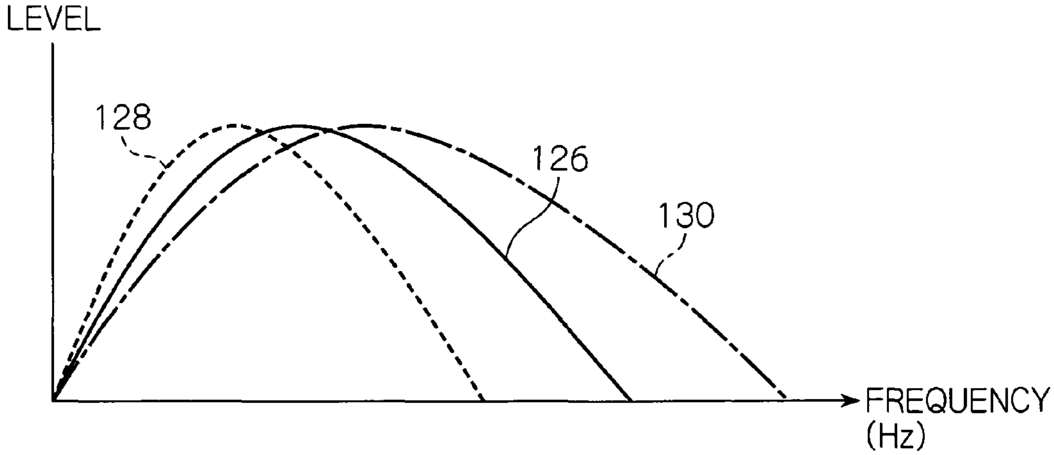
FIG. 3 is a graph useful for use in understanding how the frequency distribution converter shown in FIG. 1 converts the frequency distribution of the signals whose sampling rate has been controlled.

With reference now to FIG. 3, it will be described how to convert frequency distribution by the frequency distribution converter 104, more specifically by the frequency distribution converting processor 202. In this figure, the horizontal axis indicates frequency and the vertical axis does the voltage level of the signals 122 and 124.

In FIG. 3, the result of the FFT process by the FTT processor 201 is plotted as a solid curve 126. Now in the case of the frequency conversion signal D representing a value of 1.0, the FDC processor 202 delivers the result 120 of the FFT process done in the FFT processor 201 as it is. Therefore, the frequency distribution of the output data 124 from the frequency distribution converter 104 will be plotted as the solid curve 126. In the case of the frequency conversion signal D being 0.9, the processor 202 converts the frequency distribution of the output data 122 so that its frequency X (Hz) at a voltage level after the conversion is equal to 0.9-fold as much as the frequency Y (Hz) at the same voltage level before the conversion, i.e. $X=0.9\times Y$. Therefore, the frequency distribution will be plotted as a dotted line 128 in FIG. 3. When the frequency conversion signal D is 1.1, the converter 202 converts the frequency distribution of the output data 122 so that the frequency Z (Hz) at a voltage level after the conversion is equal to 1.1-fold as much as the frequency Y at the same voltage level before the conversion, i.e. $Z=1.1\times Y$. Therefore, the frequency distribution will be plotted as a dashed-dotted line 130 in FIG. 3.

With reference to FIG. 3, it has been described the frequency distribution converting method for extending and compressing the original frequency distribution along the frequency axis. A frequency distribution converting method for shifting the original frequency distribution along the frequency axis may be applied, in which case, if suitable, the distance of shifting may be controlled in response to the frequency conversion signal D.

The controller 105, FIG. 1, is adapted for producing the startup signal B, the conversion coefficient C and the frequency conversion signal D in response to operation by the user. The controller 105 may have a conversion table stored therein, for example, which may be of the type accessible with an address corresponding to the position of the operator, or knob, of a volume control to then obtain the startup signal B, conversion coefficient C and frequency conversion signal D. The controller 105 may be arranged to apply, at the start of communication, default values, such as the startup signal B is 10 (ms), the conversion coefficient C is 1.0, and the frequency conversion signal D is 1.0. The user may manipulate the operator of the volume control according to voice he/she listened in. For example, when the default state causes voice to skip, the user may manipulate the volume control to cause the sample rate converter 103 to change the startup signal B, the conversion coefficient C and the frequency conversion signal D so as to increase the sampling rate on its output side 116 accordingly. Otherwise, for example, when sound overlaps in the default state, he or she may manipulate the volume control to cause the sample rate converter 103 to change the startup signal B, the conversion coefficient C and the frequency conversion signal D so as to decrease the sampling rate on its output side 116 accordingly.

In addition, the method in accordance with an alternative preferred embodiment, which will be described later, may be applied wherein information on a difference in clock frequency between the transmitter 106 and the receiver 100, e.g. a count of encoded data entered into the receiver per unit of time (e.g. 10 ms), may be obtained to display that information for use in decision of the manipulation by the user. Further, the startup signal B, conversion coefficient C and frequency conversion signal D may be set or operable independently from each other.

In operation, the encoded data 108 sent from the transmitter 106 are buffered in the storage 101. In time with the startup signal B provided by the controller 105, the encoded data 108 thus stored are taken out to the connection 110 on a unit-by-unit basis and decoded by the decoder 102 to thereby obtain the decoded data 112.

The data 112 is supplied to the sample rate converter 103 to be processed. The converter 103 then adjusts the sample count per predetermined length of time, i.e. sampling rate, according to the signal B and/or conversion coefficient C.

The output data 116 having its sampling rate changed in the converter 103 is corrected for its frequency distribution by the frequency distribution converter 104 in response to a frequency conversion signal D from the controller, and in turn delivered from the frequency distribution converter 104 as the data 120, which will be converted to the analog data in the following process.

In summary, according to the preferred embodiment, even when there occurs a difference in clock frequency between the transmitter 106 and the receiver 100, it is dealt with by controlling the sample count per unit of time, i.e. sampling rate, without causing a lack of data or insertion of the data 108 itself, and a change in sound quality due to the control of the sampling rate is compensated for by converting the frequency distribution, thereby making it possible to accomplish absorption of a clock frequency difference with less degradation in quality of sound and quality of speech.

Well, an alternative embodiment of the receiver in accordance with the invention will be described with reference to FIG. 4. The alternative embodiment is intended to decide the various parameters used in the embodiment shown in FIG. 1, not manually but automatically.

Figure 4:
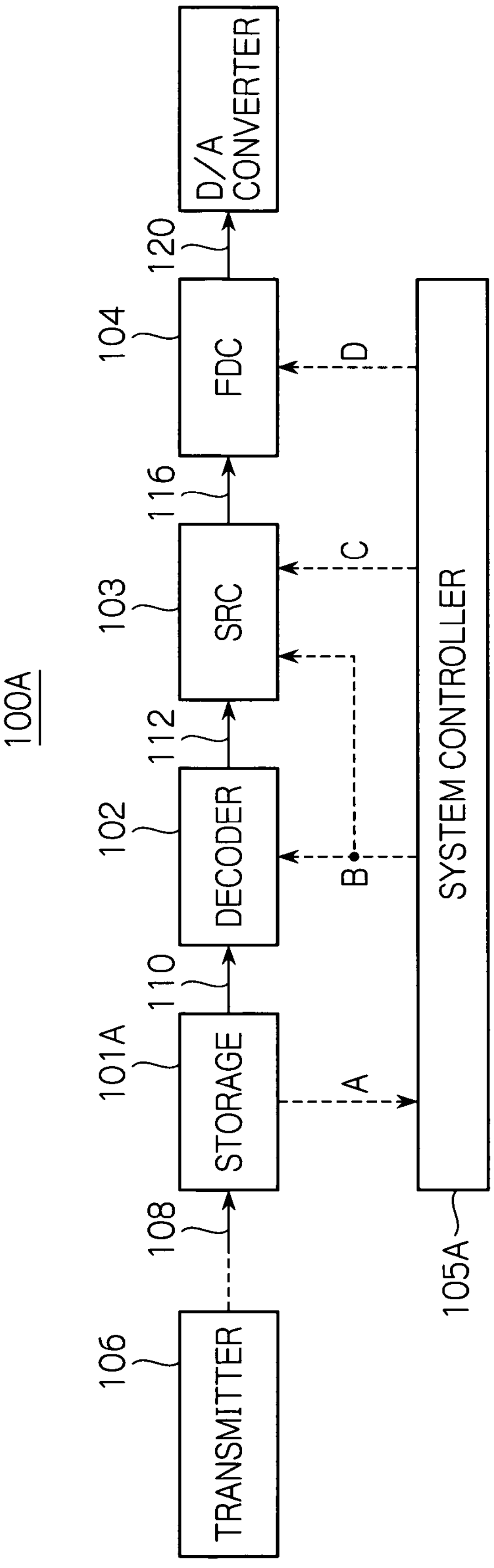
FIG. 4 is a schematic block diagram showing an alternative embodiment of the receiver in accordance with the invention.

FIG. 4 schematically shows in a block diagram the configuration of a receiver 100A in accordance with the alternative embodiment of the invention, in which like components are denoted with the same reference numerals and symbols.

In the figure, the receiver 100A of the alternative embodiment comprises a voice data receiving storage 101A, the voice decoder 102, the sample rate converter 103, the frequency distribution converter 104 and a system controller 105A, which are interconnected as depicted. In this embodiment, the voice decoder 102, sample rate converter 103 and frequency distribution converter 104 may be the same as the preferred embodiment shown in FIG. 1, and a repetitive description of their functions will not be given for avoiding redundancy.

The voice data receiving storage 101A of the alternative embodiment has, in addition to the function for buffering the encoded data 108 sent from the transmitter 106, a function for measuring a count of the encoded data 108 entered into the receiver 100A per predetermined length of time, e.g. 100 ms, to then send the measured value A to the system controller 105A over the connection 110. The predetermined length of time during which the storage 101A executes the measurement is preferably set longer sufficiently than the basic unit of processing time which the decoder 102 inherently has.

The system controller 105A is adapted for applying, on the basis of the measured value A, a predetermined conversion table or a conversion formula to generate the startup signal B, conversion coefficient C and frequency conversion signal D to feed the latter to the decoder 102, sample rate converter 103 and frequency distribution converter 104.

The alternative embodiment may be arranged to have its encoding system complying with G. 729, as with the illustrative embodiment shown in and described with reference to FIG. 1, so that the predetermined measurement time of the voice data receiving storage 101A is tenfold, e.g. 100 ms, compared with the basic unit time, e.g. 10 ms, and that encoded voice data for 10 ms, e.g. 80 samples, is the basic unit of data 108 for processing. In this case, when the count A obtained by the storage 101A as a result of its measurement is equal to a value of a, where a is a natural number, specifically when a samples are inputted to the storage 101A within a period of 100 ms, the startup signal B, conversion coefficient C and frequency conversion signal D are generated at the timing, or cycles, as follows.

By calculating the time, during which 80 samples can be obtained, based on a state where a/10 samples is obtained for the period of 10 ms, the startup cycle B is represented by the following expression (1):

$$B=8000/a \quad (1)$$

For example, when the value a is 880 samples, then a value of about 9.09 ms will be obtained for the startup cycle. When the value a is 720 samples, then a value of about 11.11 ms will be obtained for the startup cycle.

In order to convert a/10 samples for 10 ms to 80 samples for 10 ms by the sample rate converter 103, finding a coefficient C for multiplying a/10 is represented by the following expression (2):

$$C=800/a \quad (2)$$

For example, when the value a is 880 samples, then a value of about 0.91 is obtained for the coefficient C, i.e. a ratio of sampling rates of input to output. When the value a is 720 samples, then a value of about 1.11 is obtained for the coefficient C.

The frequency conversion signal D may function to change frequency distribution changed by the processing in the sample rate converter 103 in the inverse direction to thereby restore its original condition. In that case, the frequency conversion signal D can be expressed by the following expression (3), for example:

$$D=C \quad (3)$$

In accordance with the alternative embodiment, values of various parameters associated with a difference in clock frequency between the transmitter and the receiver 100A can be automatically determined to execute operation similar to the preferred embodiment shown in FIG. 1. Thus, the alternative embodiment may attain the advantages similar to those of the preferred embodiment of FIG. 1 without manual operation.

In the respective preferred embodiments described above, the processing by the frequency distribution converter is followed by the processing by the sample rate converter. The converter 100 or 100A may be adapted to dispose the processing by the frequency distribution converter before the processing by the sample rate converter. In the latter case also, the frequency distribution converter executes in advance the conversion of frequency distribution so as to negate a change in frequency distribution caused by the processing by the sample rate converter 103.

The preferred embodiments are directed to processing voice data. The present invention is also applicable to processing sound data other than voice data.

The entire disclosure of Japanese patent application No. 2009-70831 filed on Mar. 23, 2009, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A receiver apparatus for receiving a signal including an encoded sound signal transmitted from a transmitter, comprising:
- a decoder for decoding the encoded sound signal to thereby produce a decoded signal;
- a sample rate converter for controlling a count of samples of the decoded signal per unit of time, based on first information about control of sample count;
- a frequency distribution converter for converting frequency distribution, based on second information about conversion of frequency distribution;
- a sample counter for measuring the count of samples; and
- a control information generator for generating the first information and the second information, based on the count of samples measured by said sample counter.

2. A method for receiving a signal including an encoded sound signal transmitted from a transmitter, comprising:
- decoding the encoded sound signal to thereby produce a decoded signal;
- converting a count of samples of the decoded signal per unit of time, according to first information about conversion of sample count;
- converting frequency distribution according to second information about conversion of frequency distribution;
- measuring the count of samples; and
- generating the first information and the second information, based on the count of samples.

3. A computer readable medium containing program instructions for receiving a signal including an encoded sound signal transmitted from a transmitter, said program instructions, when executed by one or more processors of a computer, controlling the computer to function as a receiver by executing, the steps of:
- decoding the encoded sound signal to thereby produce a decoded signal;
- converting a count of samples of the decoded signal per unit of time, according to first information about conversion of sample count;
- converting frequency distribution according to second information about conversion of frequency distribution;
- measuring the count of samples; and
- generating the first information and the second information.

4. The receiver apparatus of claim 1, wherein the frequency distribution converter, in accordance with the second information, converts a frequency distribution of an input thereof to correct a difference between the frequency distribution of the input and that of the decoded signal.

5. The method of claim 2, wherein the converting frequency distribution includes converting, in accordance with the second information, a frequency distribution of the sampled decoded signal to thereby correct a difference between the frequency distribution of the sampled decoded signal and that of the decoded signal.

6. The computer readable medium of claim 3, wherein the step of converting frequency distribution includes converting, in accordance with the second information, a frequency distribution of the sampled decoded signal to thereby correct a difference between the frequency distribution of the sampled decoded signal and that of the decoded signal.

* * * * *